(12) United States Patent
So et al.

(10) Patent No.: US 7,669,793 B2
(45) Date of Patent: Mar. 2, 2010

(54) FOOD CUTTING DEVICE

(75) Inventors: Kwok Kuen So, 2nd Floor, Chuan Yuan Factory Building, 342-344 Kwun Tong Road, Kwun Tong, Kowloon, Hong Kong SAR (CN); Yiu Chung Wan, Hong Kong (CN); Clive Koon Yin Wong, San Leandro, CA (US)

(73) Assignee: Kwok Kuen So, Hong Kong SAR (CN)

( * ) Notice: Subject to any disclaimer, the term of this patent is extended or adjusted under 35 U.S.C. 154(b) by 237 days.

(21) Appl. No.: 11/840,484

(22) Filed: Aug. 17, 2007

(65) Prior Publication Data

US 2009/0045274 A1 Feb. 19, 2009

(51) Int. Cl.
*A01D 34/90* (2006.01)
*B02C 18/00* (2006.01)

(52) U.S. Cl. .............................. 241/169.1; 241/199.12
(58) Field of Classification Search ................. 241/168, 241/169.1, 282.2, 199.12, 292.1
See application file for complete search history.

(56) References Cited

U.S. PATENT DOCUMENTS

| 4,741,483 | A | * | 5/1988 | Damm et al. | ............ 241/46.17 |
| 4,983,046 | A | * | 1/1991 | Murata et al. | ............... 366/312 |
| 5,577,675 | A | * | 11/1996 | Ishikawa | ...................... 241/65 |

* cited by examiner

*Primary Examiner*—Faye Francis
(74) *Attorney, Agent, or Firm*—Leydig, Voit & Mayer, Ltd.

(57) ABSTRACT

A food cutting device has a bowl, two cutting blades supported in the bowl for rotation relative to each other, and a drive mechanism supported by the bowl for rotating the cutting blades to cut food in the bowl. The cutting blades are rotatable in opposite directions relative to each other to perform a scissors-like cutting action.

25 Claims, 12 Drawing Sheets

US 7,669,793 B2

FOOD CUTTING DEVICE

The present invention relates to a manually operated food cutting device that operates with a rotary action.

BACKGROUND OF INVENTION

Food cutting devices of the type concerned, such as food choppers, find common use in kitchens for cutting food items such as garlic cloves and carrot cubes into much smaller pieces. These food cutting devices are hand-operated utensils, especially those for domestic use.

In a typical construction, such food cutting devices has a container in which a rotary cutter unit is provided for cutting food in the container and includes a manually-operated drive mechanism atop or on one side for driving the cutter unit. The drive mechanism usually incorporates a handle on a crank for turning by a user.

The performance of such food cutting devices is not found to be satisfactory, especially concerning how small they can cut food into and how quickly they can do so.

The invention seeks to obviate or at least alleviate one or more of such problems or shortcomings by providing a new or otherwise food cutting device.

SUMMARY OF THE INVENTION

According to a first aspect of the invention, there is provided a food cutting device comprising a container, at least two cutting blades supported in the container for rotation relative to each other, and a drive mechanism supported by the container for rotating the cutting blades to cut food in the container. The cutting blades are rotatable in opposite directions relative to each other.

Preferably, the food cutting device includes a support supporting the cutting blades for rotation.

More preferably, the support has first and second parts rotatable relative to each other, the first part supporting a first of the cutting blades and the second part supporting a second of the cutting blades.

Further more preferably, the support is elongate and its first and second parts extend over externally distinct sections along the longitudinal extent of the support.

In a preferred embodiment, the first and second parts of the support comprise inner and outer parts of the support.

More preferably, the outer part of the support is tubular, and the inner part extends co-axially at least partially within the outer part.

Further more preferably, the inner and outer parts of the support are inter-engaged against relative displacement along the longitudinal extent of the support.

Further more preferably, the inner part of the support has a lower end which extends out of the outer part and on which the support may stand on a bottom of the container.

Yet further more preferably, the lower end of the inner part of the support is radially expanded.

In a preferred embodiment, the drive mechanism includes two drive output members arranged to rotate in opposite directions, and the inner and outer parts of the support have respective upper ends rotationally engageable with the drive output members for drive transmission.

More preferably, at least one of the upper ends of the inner and outer parts of the support has a socket, into which the associated drive output member is insertable for rotational engagement therewith.

More preferably, a first of the two drive output members co-axially surrounds the other second drive output member, with which first and second drive output members the outer and inner parts of the support are engageable by their upper ends respectively.

More preferably, the engagement between the two drive output members and the upper ends of the inner and outer parts of the support is releasable, such that the support with cutting blades is detachable from the drive mechanism.

It is preferred that the drive mechanism is provided in the lid, and the cutting blades are loosely placed in the container for driving engagement by the drive mechanism as the lid closes upon the container thereby holding the cutting blades in position inside the container.

It is further preferred that at least one self-locking device is provided between the lid and the container for automatically locking the lid closed when the lid closes upon the container.

Preferably, the drive mechanism rotates each of the cutting blades in a single direction.

Preferably, the drive mechanism rotates each of the cutting blades in an intermittent manner.

More preferably, the drive mechanism includes a manually operable actuator for generating drive, which is arranged to be reciprocated in opposite directions for operation, and the drive mechanism further includes a unidirectional transmitter for transmitting drive to the cutting blades when and only when the actuator is moved in one direction.

Further more preferably, the unidirectional transmitter comprises a one-way clutch.

Further more preferably, the actuator is resiliently biased to move in the other direction for self return upon release.

Further more preferably, the container has an upper lid, and the actuator lies on an outer surface of the lid for reciprocation on the surface.

In a preferred embodiment, the food cutting device includes at least two said cutting blades at an upper level and at least two said cutting blades at a lower level.

It is preferred that the cutting blades at each of the upper and lower levels are equi-angularly spaced.

It is preferred that there are more cutting blades at the lower level than at the upper level.

According to a second aspect of the invention, there is provided a food cutting device comprising a container, at least two cutting blades supported in the container for relative angular movement relative to each other to perform a scissors-like cutting action to cut food in the container, and a drive mechanism supported by the container for driving said at least two cutting blades.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
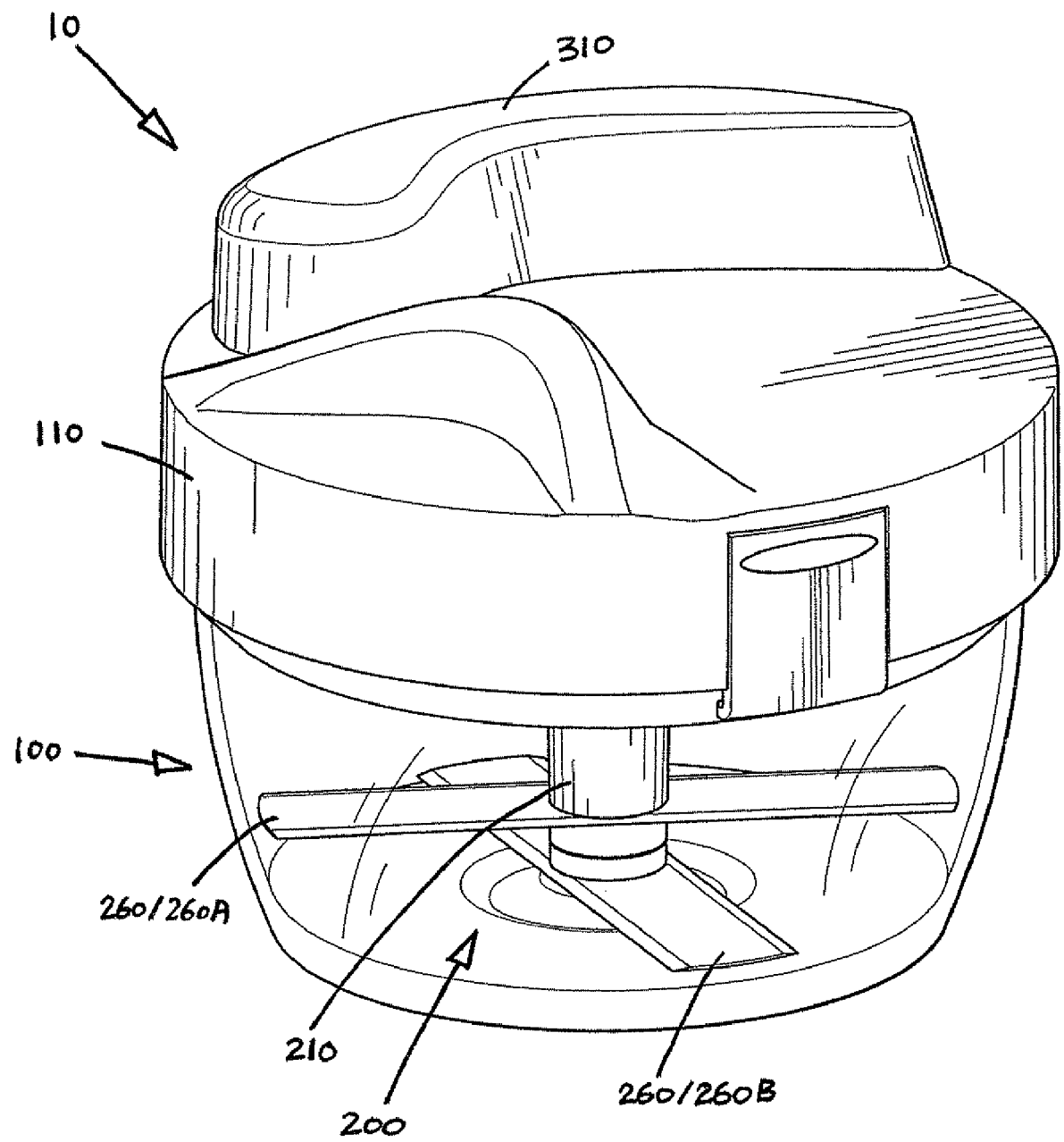
FIG. 1 is a perspective view of an embodiment of a food cutting device in accordance with the invention, having a container with a lid and a pair of cutting blades in the container.
Figure 2:
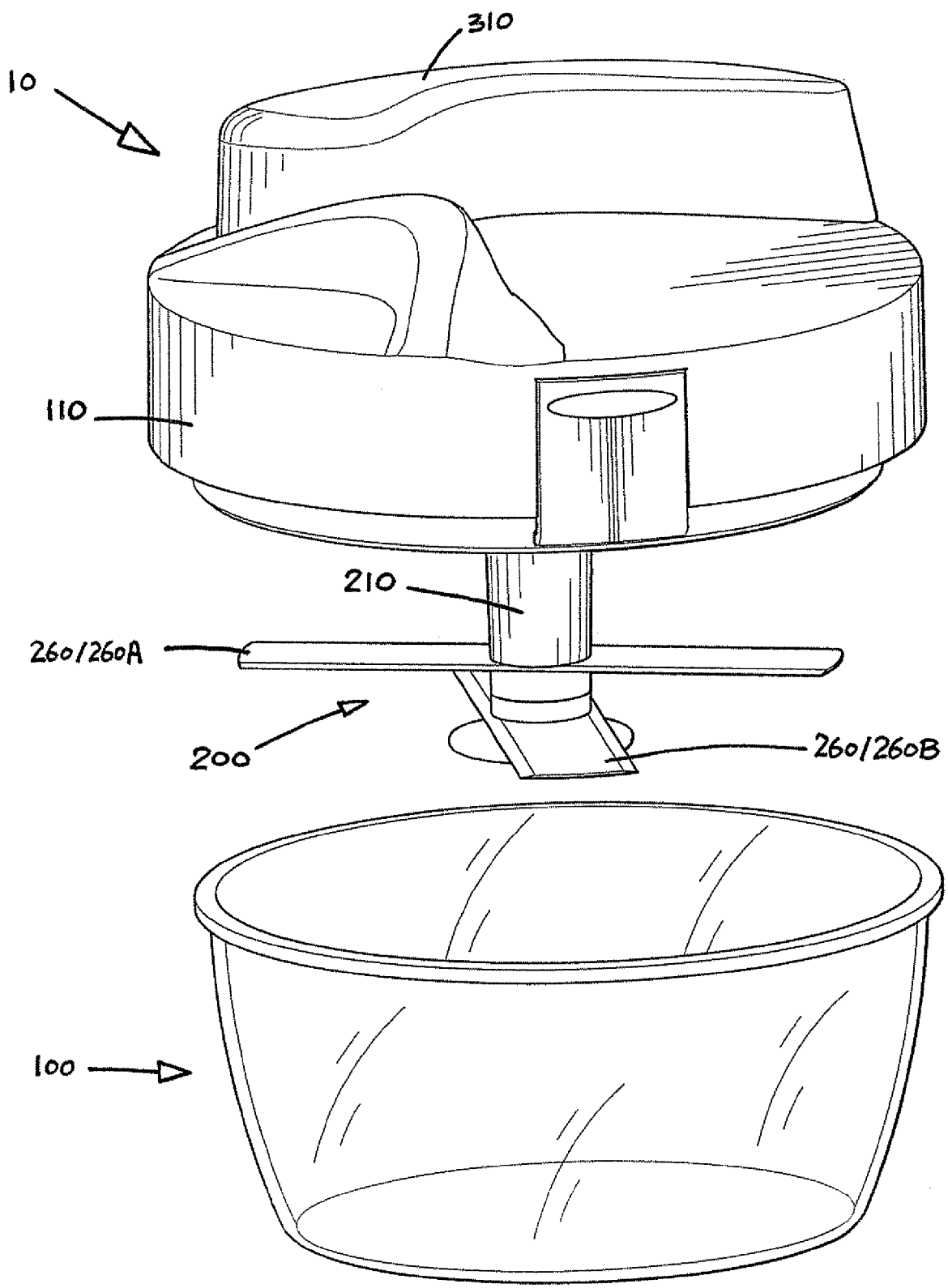
FIG. 2 is a perspective view similar to FIG. 1, showing the lid opened.
Figure 3:
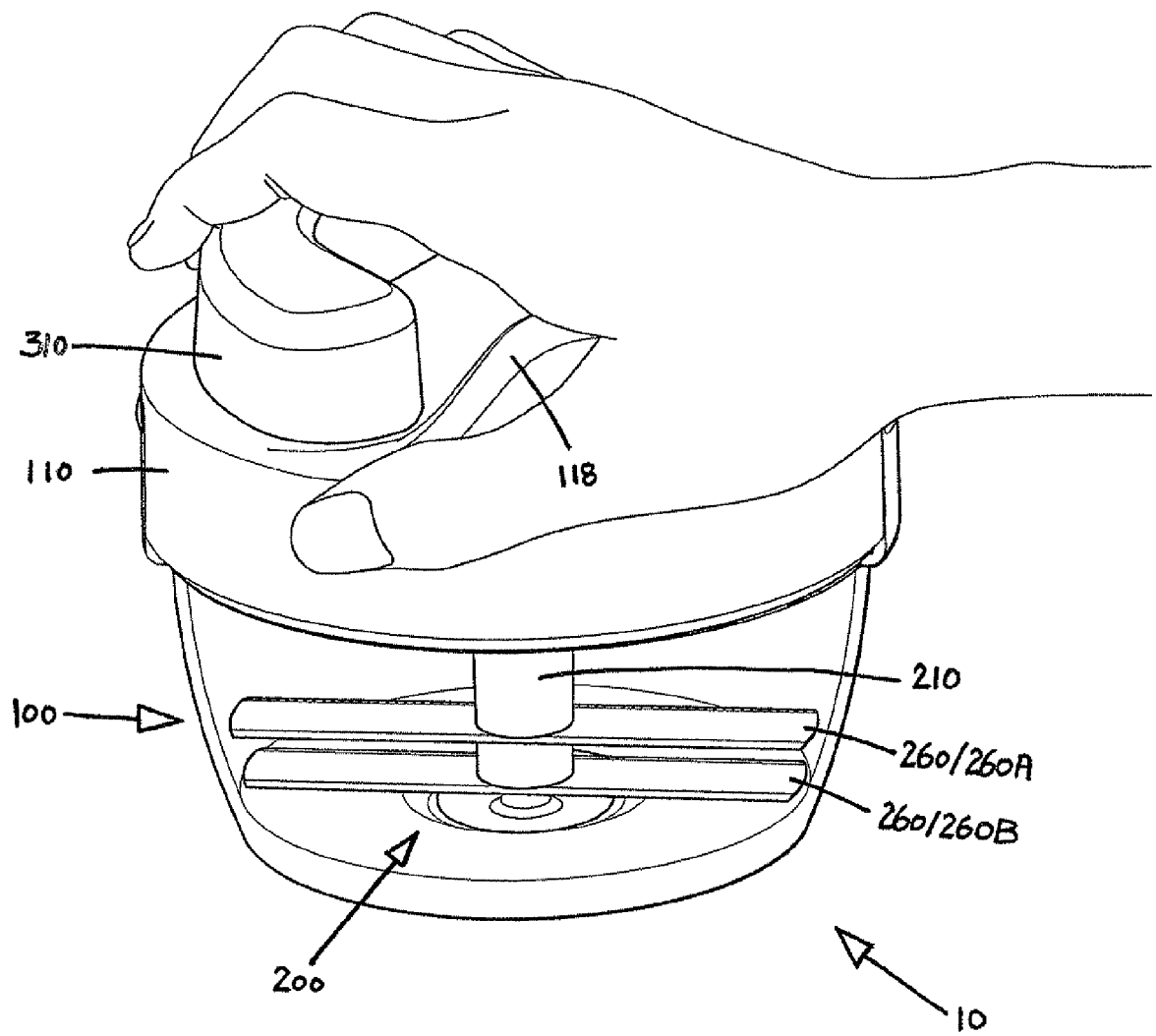
FIG. 3 is another perspective view of the food cutting device of FIG. 1, being operated by the right hand of a user.
Figure 4:
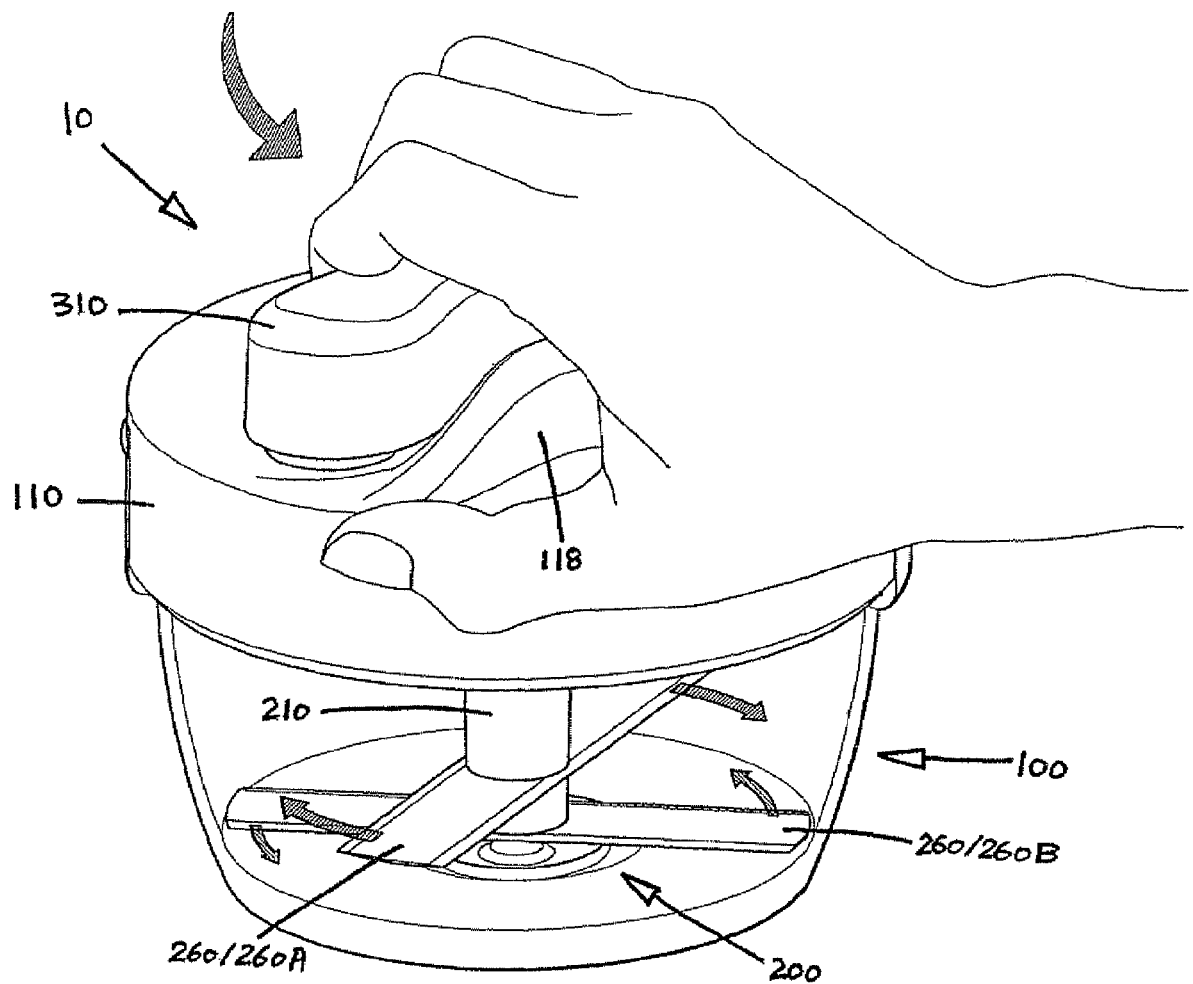
FIG. 4 is a perspective view similar to FIG. 3, showing the hand pivoting a lever on the lid to turn the cutting blades.

Referring to FIGS. 1 to 13 of the drawings, there is shown a food cutting device in the form of a food chopper embodying the invention, which has a body taking the form of a plastic bowl 100 with a circular lid 110 and includes a chopper unit 200 in the bowl 100. The chopper unit 200 is a removable unit implemented by a pair of straight metal cutting blades 260 that are supported horizontally at mid-length on a vertical plastic shaft 210. Each of the cutting blades 260 has a pair of opposite limbs that are symmetrical and are equi-angularly spaced.

Inside the bowl 100, the shaft 210 is arranged to be turned about its own axis X to thereby rotate the cutting blades 260 about the axis X for cutting food items, such as garlic cloves or carrot cubes, held in the bowl 100. The lid 110 is hollow and houses a drive mechanism 300 for driving the chopper unit 200 i.e. rotating the cutting blades 260.

Figure 8:
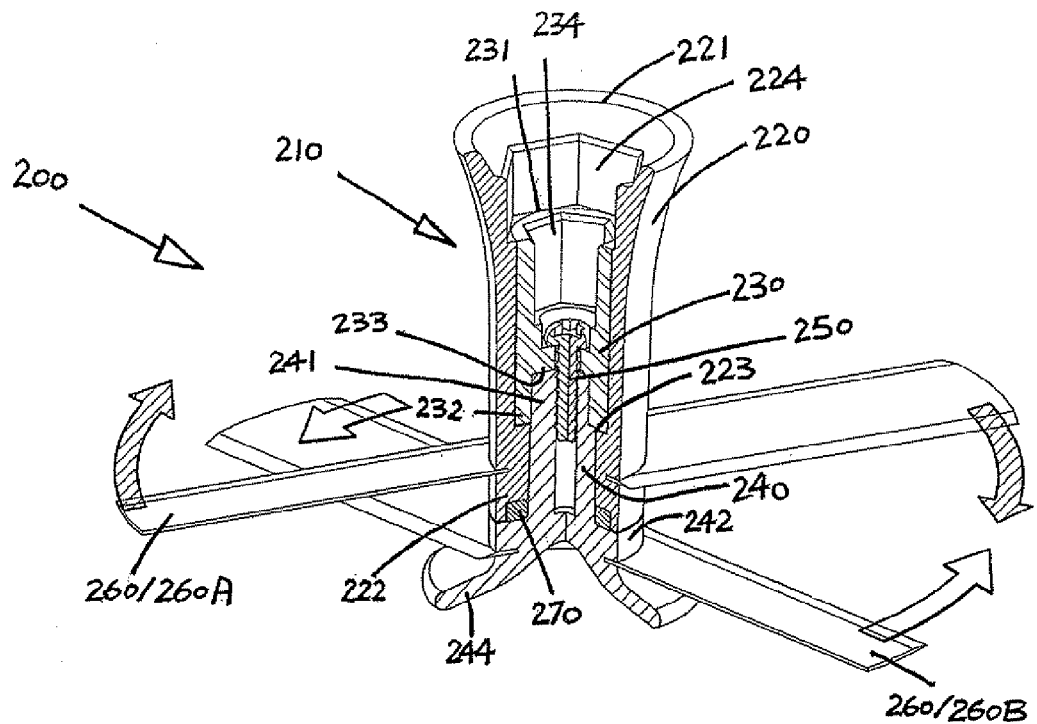
FIG. 8 is a perspective view of the cutting blades of FIG. 4, being mounted on a shaft that is partially cut to show its construction.
Figure 9:
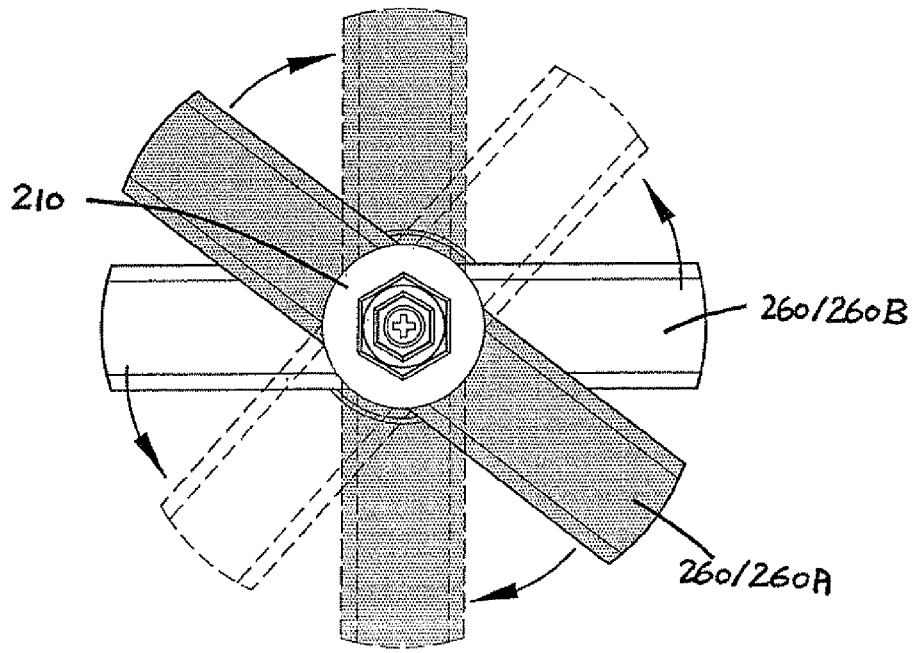
FIG. 9 is a top plan view of the cutting blades and shaft of FIG. 8.
Figure 10:
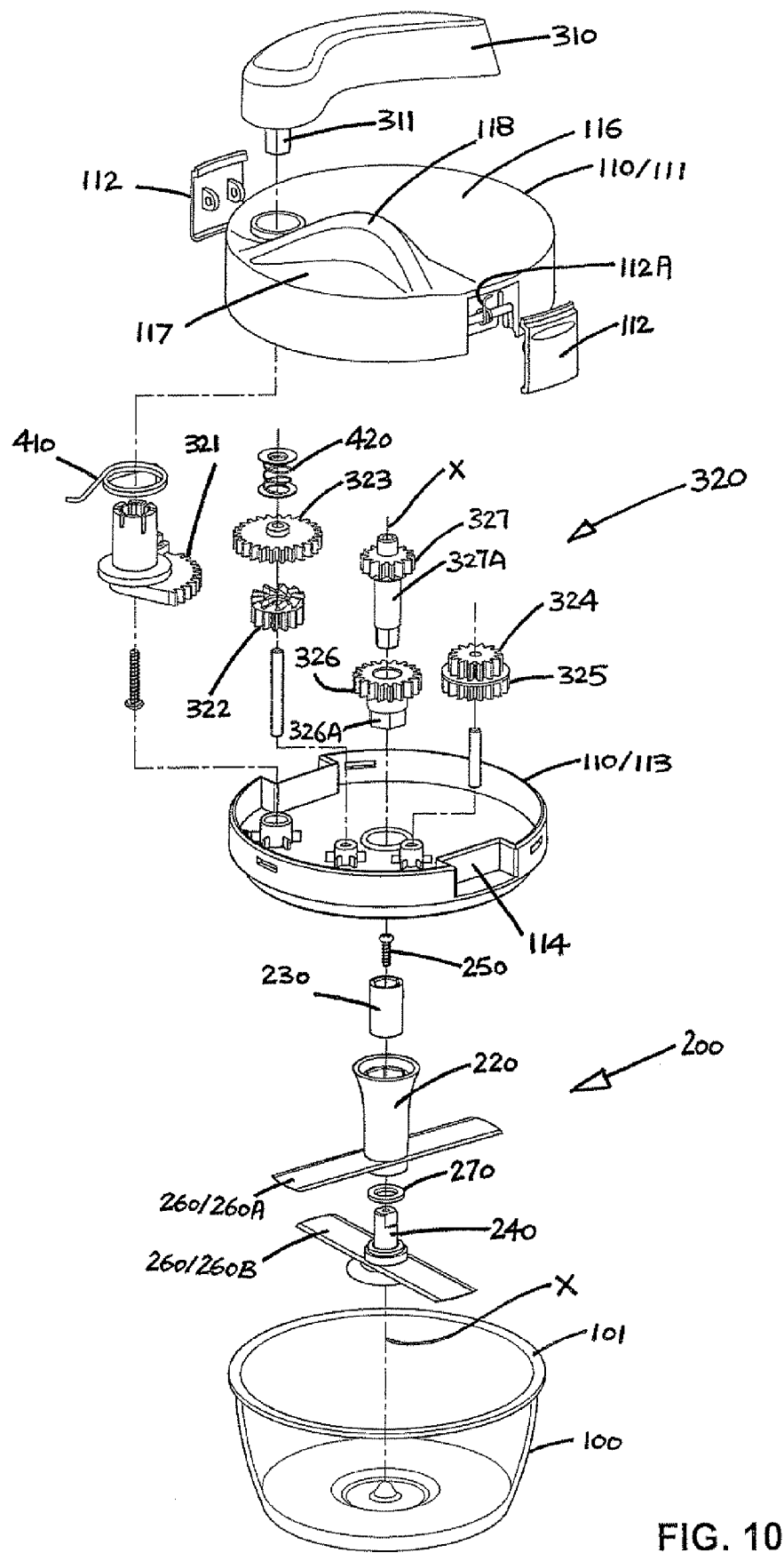
FIG. 10 is an exploded perspective view of the food cutting device of FIG. 1, showing various components thereof including a drive mechanism in the lid.
Figure 11:
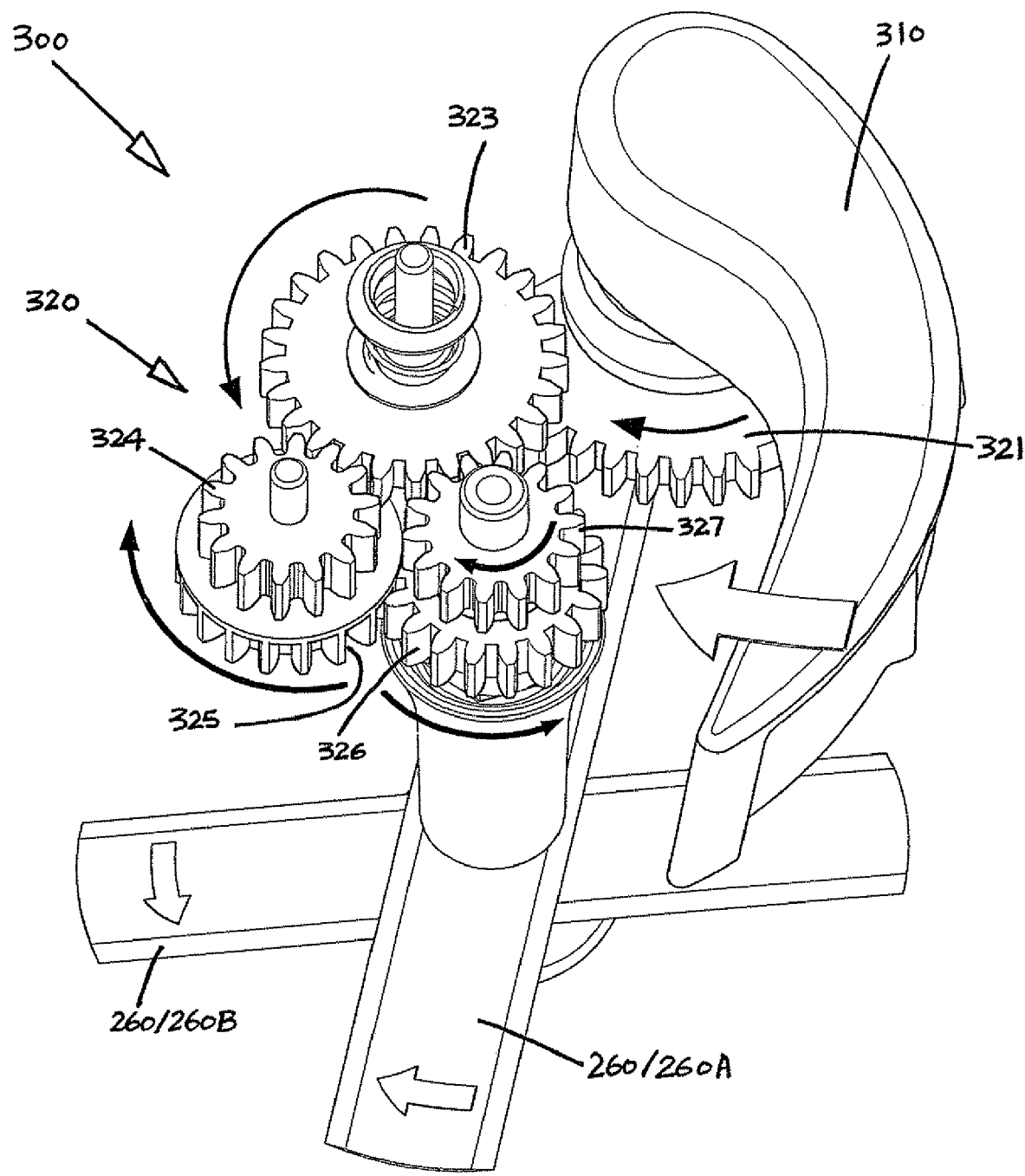
FIG. 11 is a perspective view of the drive mechanism of FIG. 10, assembled and in operation.
Figure 12:
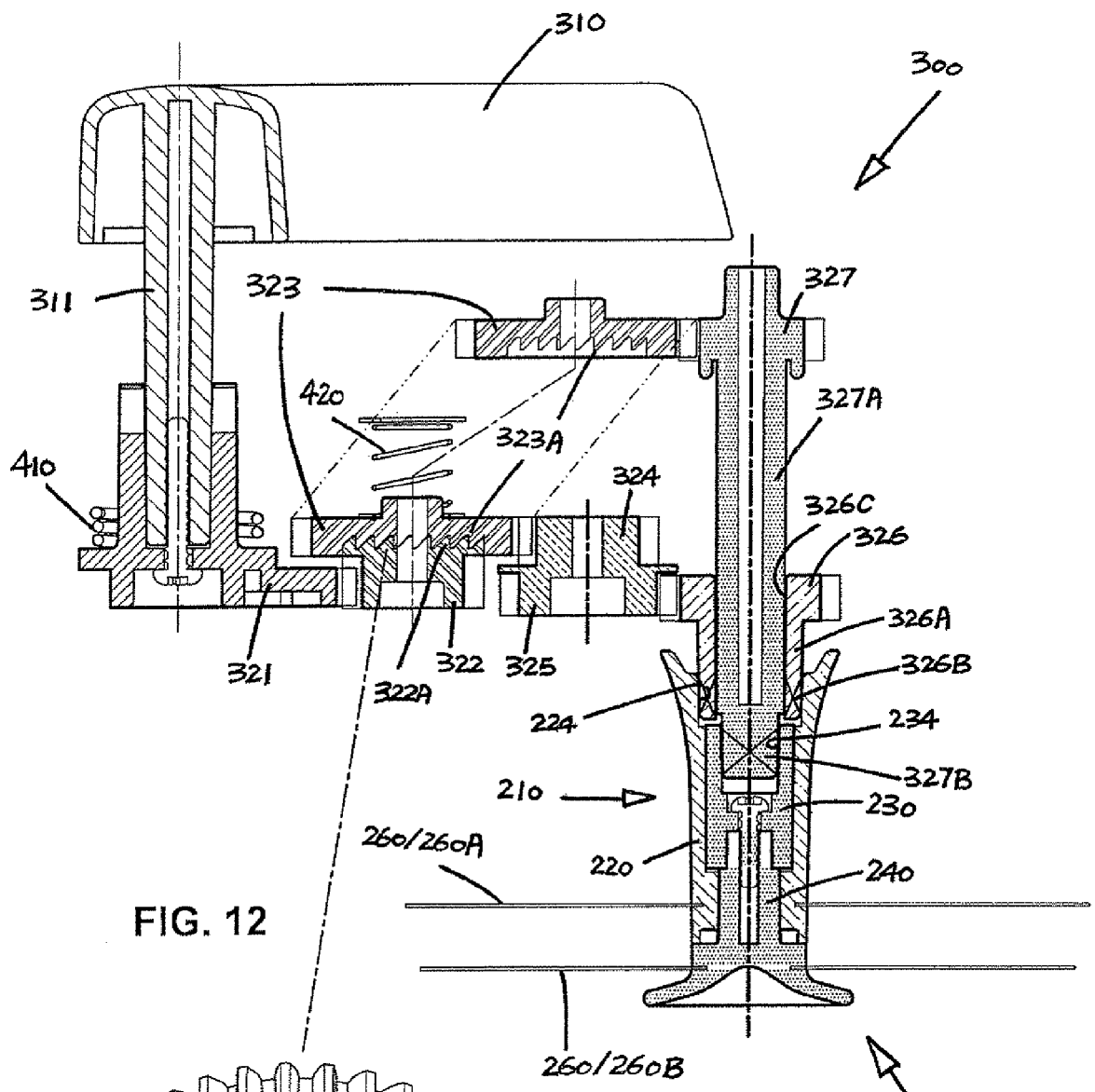
FIG. 12 is a schematic cross-sectional side view of the drive mechanism of FIG. 11.
Figure 13:
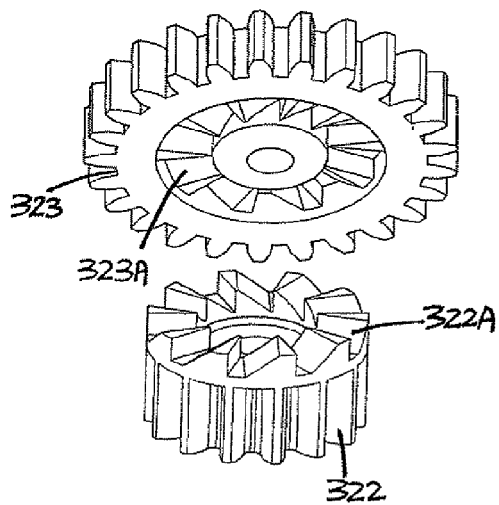
FIG. 13 is an enlarged perspective view of a one-way clutch of the drive mechanism of FIG. 12.

As best shown in FIG. 8, the shaft 210 has a composite structure which is formed by a cylindrical sleeve 220 and a pair of upper and lower tubular cores 230 and 240 that extend co-axially partially within the sleeve 220. The sleeve 220 has a flared upper end 221 and a straight lower end 222, with an annular shoulder 223 formed within the lower end 222. The upper end 221 defines a hexagonal socket 224 facing upwardly.

The upper core 230 is straight cylindrical and it fits slidably wholly within the sleeve 220, with its lower end 232 abutting the sleeve's shoulder 223, for free turning relative to the sleeve 220 about the axis X. The core 230 includes a radially-extending partition 233 at a position about one-third of its length from the lower end 232. An upper end 231 of the core 230 defines a relatively smaller second upwardly-facing hexagonal socket 234 which is located right below the first socket 224 of the sleeve 220. The two sockets 224 and 234 are co-axially arranged.

The lower core 240 has a cylindrical upper shank 241 and a thickened lower end 242 which flares radially outwards to form a flat conical base 244. The shank 241 fits slidably within a cavity defined by the lower ends 222 and 232 of the sleeve 220 and upper core 230 below the upper core's partition 233, such that the core 240 may be freely turned relative to the sleeve 220 about the axis X. The core's lower end 242 and base 244 extend out of the sleeve's lower end 222.

A central screw 250 in the upper core 230 secures downwardly through the partition 233 into the shank 241 of the lower core 240, and is tightened to join the two cores 230 and 240 firmly together, yet remaining slidingly rotatable relative to the sleeve 220. The sleeve's lower end 222 bears axially upon the lower core's lower end 242 from behind (i.e. downwardly as shown) via a metal ring bearing 270 to facilitate relative rotation between the sleeve 220 and the combined cores 230/240. The two parts 220 and 230/240 are inter-engaged against relative displacement along the longitudinal extent of the shaft 210.

Viewed externally, the shaft 210 has two distinct sections along its longitudinal extent i.e. the sleeve 220 that extends over about 90% of the length of the shaft 210 from its top and the bottom portion 242/244 that extends over the remaining length.

The two cutting blades 260 are mounted fast on the lower end 222 of the sleeve 220 and the lower end 242 of the lower core 240 respectively, as upper and lower blades 260A and 260B that are spaced at a relatively small distance (e.g. 6-10 mm) vertically apart. The arrangement is such that the two blades 260A and 260B may be rotated independently (in opposite directions relative to each other) by their respective supports, i.e. the sleeve 220 and the combined cores 230/240, to turn on co-parallel horizontal planes about the axis X.

Figure 6:
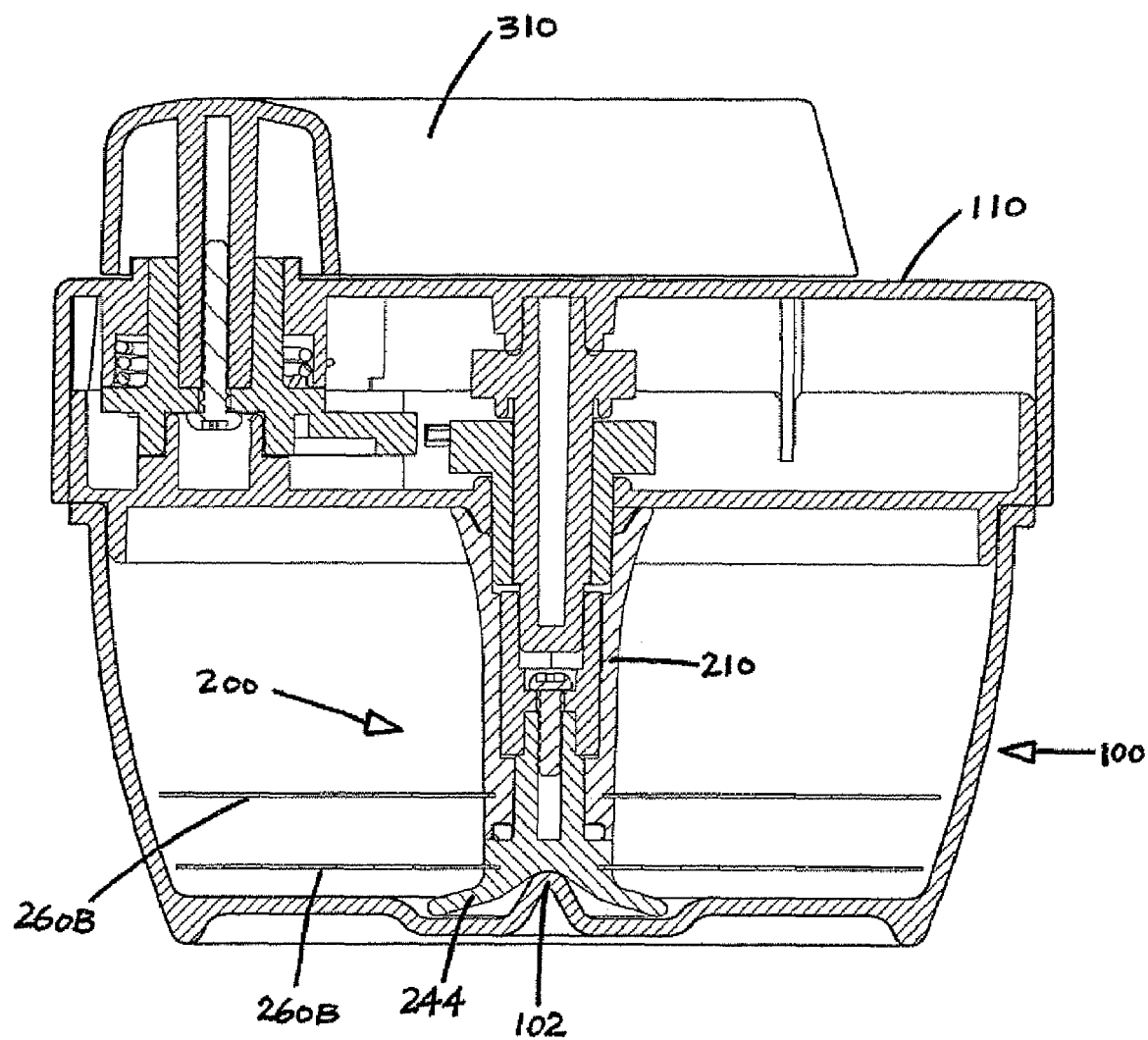
FIG. 6 is a cross-sectional view of the food cutting device of FIG. 5, taken along line VI-VI.
Figure 7:
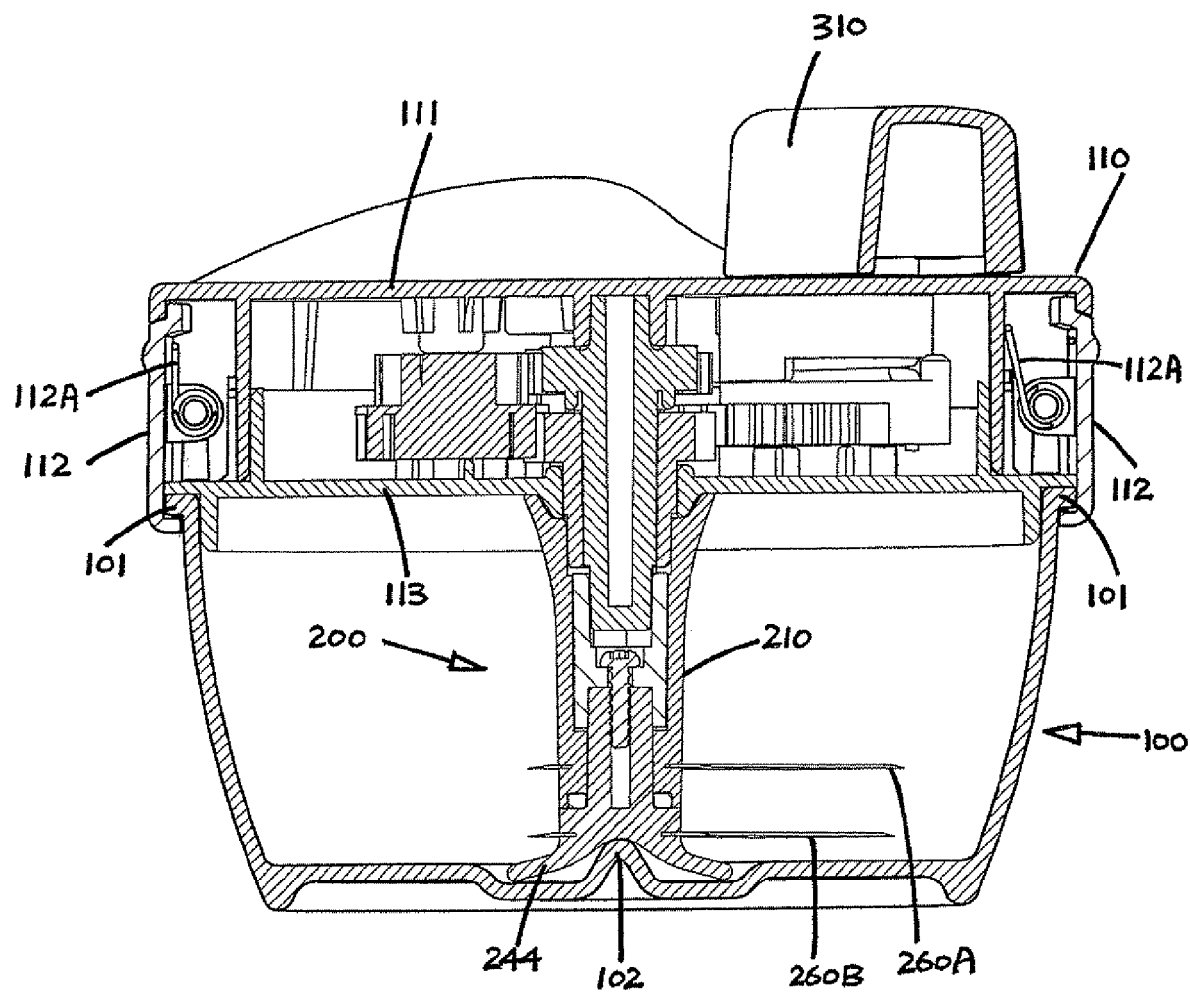
FIG. 7 is a cross-sectional view of the food cutting device of FIG. 5, taken along line VII-VII.

Inside the bowl 100, the chopper unit 200 is centrally located with the base 244 of its shaft 210 resting on a small central cone 102 upstanding from the bottom wall of the bowl 100 (FIGS. 6 and 7). The conical base 244 bears centrally upon the apex of the cone 102, with the cone 102 acting as an axial support holding the shaft 210 upright for rotation about its axis. The lower blade 260B is arranged close to the bottom wall (e.g. 5-7 mm). The upper end 221 of the shaft 210 (including sockets 224 and 234) extends close to the center of the lid 110 from below, in which the drive mechanism 300 is installed.

The lid 110 has a cap-like lid body 111 closed by a pan base 113 from below. The upper surface of the lid body 111 is contoured to form two relatively larger and smaller flat regions 116 and 117 and a crescent ridge 118 separating the two regions 116 and 117.

The lid body 111 incorporates, on diameter metrically opposite sides thereof, a pair of hinged hooks 112 which lie generally vertically and flush with the side peripheral surface of the cap 111 and are resiliently biased inwards for action by individual springs 112A. The pan base 113 includes a pair of opposite side recesses 114 accommodating respective inner formations of the lid body 111 that support the springs 112A.

Both of the hooks 112 point downwardly and are slightly exposed for engaging a peripheral flange 101 of the bowl 110 through a snap action, thereby automatically locking the lid 110 in position upon closing the bowl 100. The hooks 112 should be pressed to pivot outwards to release the bowl 100 before the lid 110 can be opened.

The hooks 112 are a safety feature, by ensuring that the lid 110 cannot be accidentally opened especially when the cutting blades 260 are being driven to turn and cut inside the bowl 100.

The drive mechanism 300 comprises a manually operable actuator in the form of a horizontal curved lever 310 and a gear train 320 for transmitting drive, at an increased speed, from the lever 310 to the chopper unit 200. The lever 210 lies on, or very close to, the larger flat region 116 of the lid 110. The gear train 320 is formed by a series of seven gears 321 to 327 supported within the lid 110 for rotation about vertical axes.

The leading gear 321 has a quadrant shape with teeth that extend over an angle of about 90°. It has an upwardly-facing square socket that is engaged by a square drive 311 depending from one end of the lever 310, about which the lever 310 is supported and pivotable to reciprocate in opposite directions about a common axis. A torsion spring 410 resiliently biases the leading gear 321 to turn anti-clockwise. By reason of the geometry of the lid 110, or certain internal parts thereof, the leading gear 321 is restricted to turn through an angle of about 60°, and so is the lever 310 that being attached to the gear 321.

Figure 5:
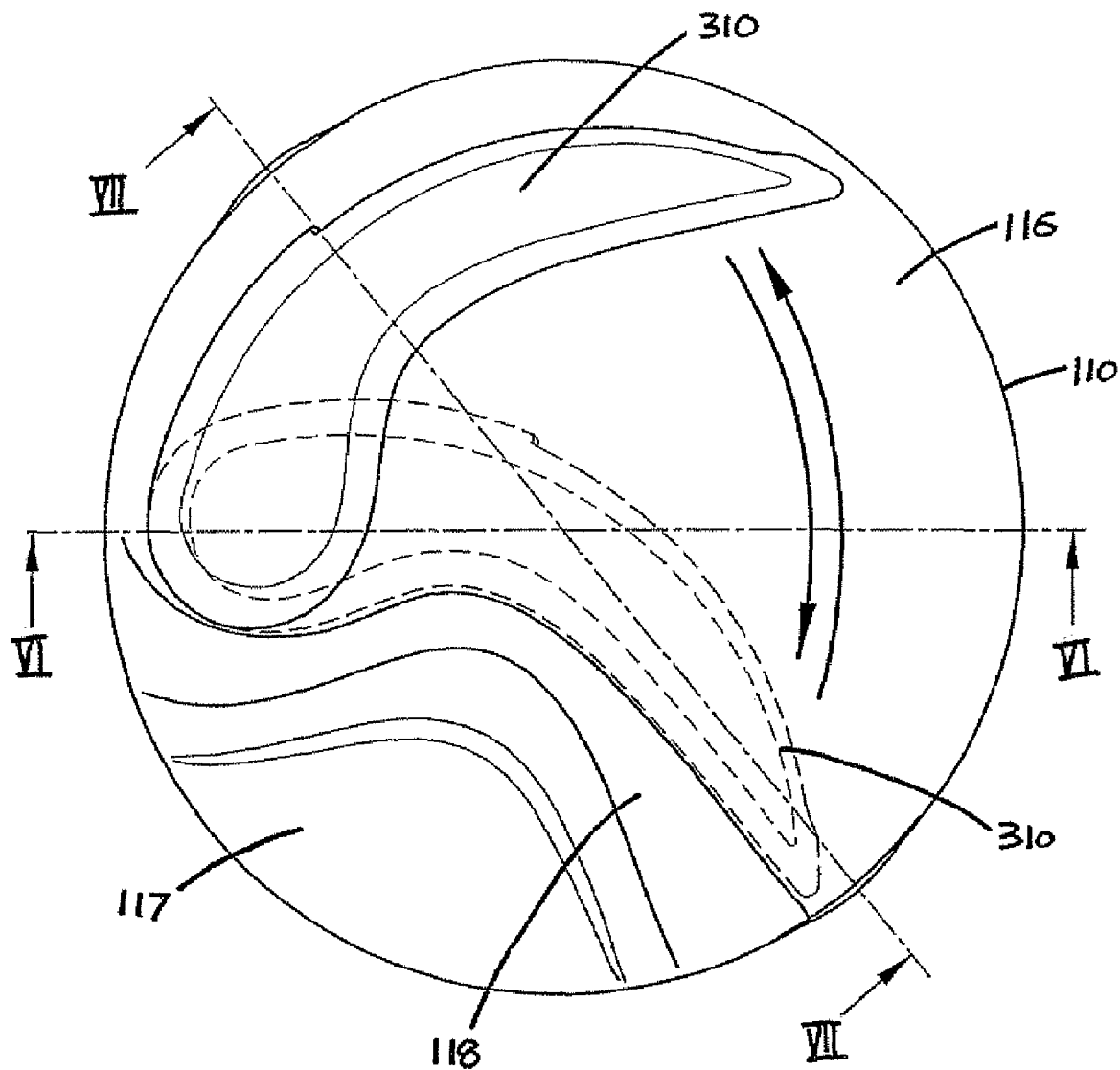
FIG. 5 is a top plan view of the food cutting device of FIG. 4, illustrating the movement of the lever.

Under the action of the spring 410, the lever 310 normally stays in an outer angular position alongside the periphery of the lid 110 (as shown by solid lines in FIG. 5). The lever 310 is manually pivotable clockwise i.e. in a working direction, against the action of the spring 410, to an inner position against the ridge 118 (as shown by dashed lines in FIG. 5). Upon release, the lever 310 will self-return to the outer position anti-clockwise i.e. in a non-working direction.

In operation, the lever 310 is pivoted clockwise and released to self-return anti-clockwise, repeatedly by the right hand of a user. The ball of his thumb is to bear against the opposite side of the ridge 118 or an adjacent side of the lid 110 for support (FIG. 4), whereby one-hand operation is facilitated.

The second and third gears are gearwheels 322 and 323 that are supported, with the latter lying horizontally on the former, for rotation about a common axis. The upper principal side of the lower second gearwheel 322 and the lower principal side of the upper third gearwheel 323 are formed with respective rings of teeth 322A and 323A in mesh with each other for drive transmission. The teeth 322A and 323A are asymmetrical or skewed in opposite directions such that the third gearwheel 323 can only be driven by the second gearwheel 322 in one and only one direction i.e. a driving direction, together acting as a unidirectional or one-way clutch, a tooth clutch.

The second gearwheel 322 is rotationally engaged with the leading gear 321 for turning thereby in opposite directions. The third gearwheel 323 is resiliently biased downwards against the second gearwheel 322 by a coil spring 420, and is movable upwardly against the action of the spring 420 to disengage from the second gearwheel 322 when the second gearwheel 322 is turning in a non-driving direction (i.e. opposite to the driving direction).

As the lever 310 is pivoted in the working direction, the leading gear 321 turns the second gearwheel 322, which in turn rotates the third gearwheel 323, whereby rotational drive is transmitted. Upon release, the lever 310 returns anti-clockwise. Although the second gearwheel 322 follows and reverses turning simultaneously, the third gearwheel 323 immediately disengages from the second gearwheel 322 and hence stops, through release of the one-way clutch slipping in the reversed direction, whereby the rotational drive is not transmitted.

Overall, by reason of the unidirectional clutching action between them, the second and third gearwheels 322 and 323 will only transmit drive in one direction but not the opposite direction.

The fourth and fifth gears are gearwheels 324 and 325 that are integrally interconnected, with the former lying horizontally on the latter, for simultaneous rotation in either direction about the same axis. The fourth gearwheel 324 is driven directly by the third gearwheel 323, with the fifth gearwheel 325 passing the rotational drive onto the sixth gear 326. The seventh gear 327 is driven directly by the third gearwheel 323 for receiving rotational drive directly therefrom.

The sixth gear 326 is a horizontal gearwheel having an integral central spindle 326A depending downwardly therefrom. The spindle 326A has a hexagonal-sectioned lowermost end 326B which is inserted into the outer socket 224 of the shaft 210 of the chopper unit 200, for releasable engagement with the sleeve 220 of the shaft 210 to turn the upper cutting blade 260A. A cylindrical central passage 326C extends right through the sixth gear 326 and spindle 326A.

The seventh gear 327 has a similar structure, i.e. being a horizontal gearwheel including a depending central spindle 327A having a hexagonal-sectioned lowermost end 327B. The spindle 327A is inserted downwardly through the central passage 326C of the sixth gear 326, with its hexagonal end 327B inserted into the inner socket 234 of the chopper unit's shaft 210, for releasable engagement with the combined cores 230/240 of the shaft 210 to turn the lower cutting blade 260B.

The two gear spindles 326A and 327A inter-engage with one extending through/surrounding the other as a sliding fit, whereby they are mutually supported to render the sixth and seventh gears 326 and 327 rotatable independently about their common central axis. Because the third gear 323 drives the seventh gear 327 directly but the sixth gear 326 via the combined gears 324/325 that act as one, the sixth and seventh gears 326 and 327 are rotated simultaneously but in opposite directions.

The sixth and seventh gears 326 and 327 act as a pair of drive output members of the drive mechanism 300 for driving the cutting blades 260A and 260B respectively. In particular, the gear spindles 326A and 327A are co-axially arranged such that their hexagonal ends 326B and 327B form a composite drive head which projects from the lower side of the lid 110 at a central position ready for engagement with the co-axial sockets 224 and 234 at the upper shaft end of the chopper unit 200 placed centrally in the bowl 100, as the lid 110 closes upon the bowl 100.

Whilst the chopper unit 200 is loosely placed in the bowl 100, it stands right in the middle as assisted by engagement between the chopper shaft base 244 and the bowl bottom cone 102, at the right position ready for driving engagement by the drive mechanism 300 as the lid 110 closes upon the bowl 100 thereby holding the chopper unit 200 and in particular the cutting blades 260 in position inside the bowl 100.

Inside the bowl 100, the chopper unit 200 is supported at its lower shaft end by the bottom cone 102 of the bowl 100 and is located at its upper shaft end by the drive head formed by the spindle ends 326B and 327B. Being supported at opposite ends, the chopper unit 200 is ready for rotation by the drive mechanism 300 in the lid 110.

As the two cutting blades 260 are turned in opposite directions, their limbs cross each other repetitively, each time performing a scissors-like cutting action (or cross-cutting action i.e. cutting in from opposite directions), at each of both opposite blade ends or limbs, upon food items in the bowl 100. Such scissors-like cutting actions are rather effective in cutting up food items, compared with the situation where the cutting blades turn and cut in the same direction.

The various gear ratios in the gear train 320 are predetermined such that the resultant gear ratios for the drive output gears 326 and 327 are the same, such that the gears 326 and 327 turn at the same speed (in opposite directions). At a resultant gear ratio of say 5:1 for example, upon the actuating lever 310 being pivoted through a maximum angle of travel of about 60° each time (in the working direction), both of the cutting blades 260 will be turned through almost one revolution. Counting the opposite limbs of both cutting blades 260, about seven scissors-like cutting actions will be performed, in less than half a second.

The cutting blades 260 will stop as the lever 310 returns upon release (in the non-working direction), by reason of the aforesaid disengagement and slipping between the second and third gearwheels 322 and 323 in the reversed direction of the one-way clutch. Accordingly, each cutting blade 260 will be rotated in a single direction.

In general, the cutting blades 260 will turn/cut and stop in an intermittent manner as the lever 310 is pivoted and released, reciprocating in opposite directions. The chopper unit 200 can easily be detached from the drive mechanism 300, conveniently as the lid 110 is opened, and it can then be taken out for cleaning.

In a different embodiment, the unidirectional clutch action between the second and third gearwheels 322 and 323 may be omitted, with the result that the chopper unit 200 will also cut in the reversed direction when the lever 310 self-returns under the action of the spring 410. This may save time as the chopper unit 200 operates either way i.e. without break. However, the reversed cutting force may not be sufficient depending on the strength of the spring 410 but if the spring 410 is too strong it may hinder manual pivoting of the lever 310 i.e. in the clockwise direction.

It is envisaged that the cutting blades 260 may not necessarily be straight and, for example, they may be slightly curved inwardly for a more effective cutting angle.

Figure 14:
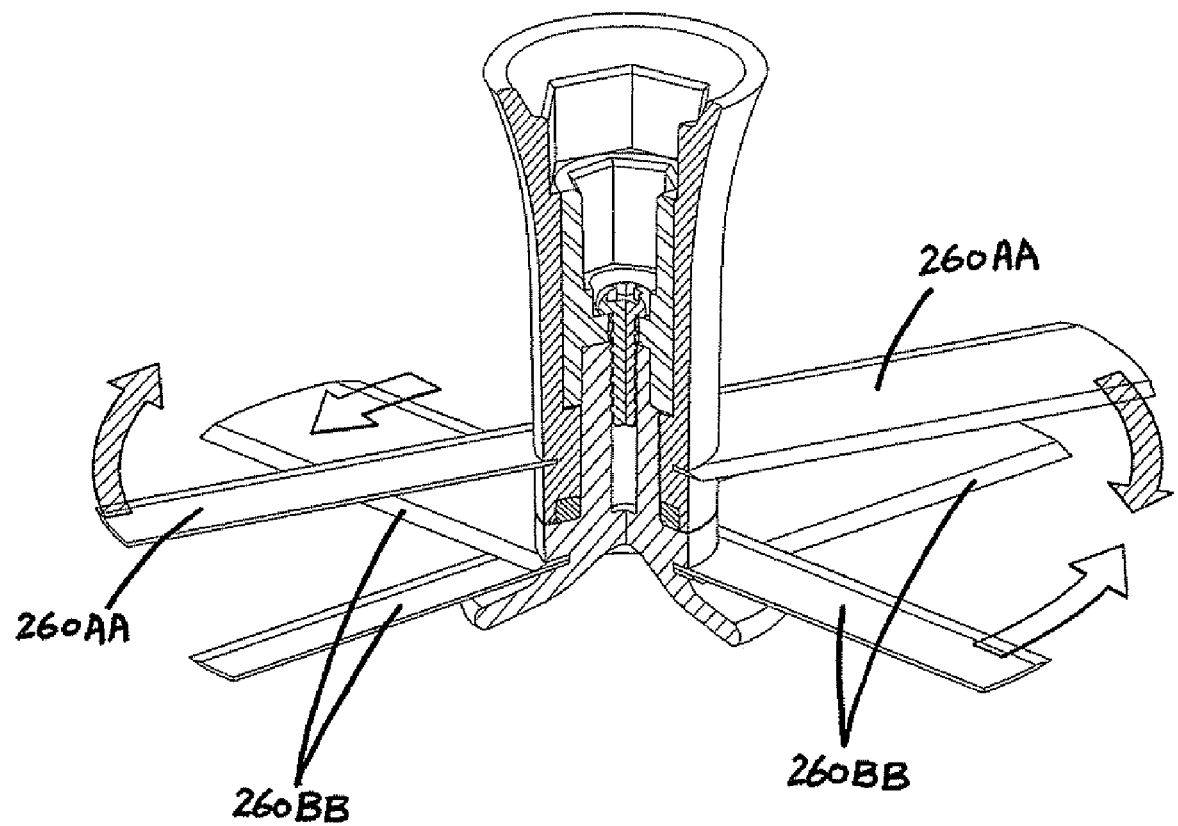
FIG. 14 is a perspective view of cutting blades of a slightly different embodiment of a food cutting device in accordance with the invention.

In a preferred embodiment as shown in FIG. 14, for better improvement, one of the cutting blades and in particular the lower blade may have four limbs 260BB spaced at 90° apart (i.e. in the form of a cross), whilst the upper cutting blade remains straight (i.e. having two limbs 260AA spaced at 180° apart). This will improve the efficiency in cutting by increasing the number of times the upper and lower cutting blade limbs cross each other cutting scissors-like, and yet the force required to pivot the operating lever 310 is not much greater.

Using more cutters at the lower deck of the chopper unit 200 (i.e. lower cutting blade limbs 260BB) would enhance slicing upon food items at the bottom of the bowl 100, and this is important especially at the beginning of the chopping operation or for relatively large pieces of food items that remain to be cut.

The invention has been given by way of example only, and various other modifications of and/or alterations to the described embodiment may be made by persons skilled in the art without departing from the scope of the invention as specified in the appended claims.

The invention claimed is:

1. A food cutting device comprising:
   a container;
   a support supported in the container and including
      a rotatable tubular outer part on which a first cutting blade is mounted, and
      a rotatable inner part, coaxial with the outer part, on which a second cutting blade is mounted, the tubular outer part being rotatable independent of rotation of the inner part; and
   a drive mechanism supported on the container for driving and rotating the first and second cutting blades in opposite directions relative to each other to cut food located in the container, wherein
      the drive mechanism includes first and second drive output members respectively rotating the first and second cutting blades, and
      the first and second drive output members are respectively axially engageable with and axially releasable from the inner and outer parts of the support, so that the support is axially detachable from the drive mechanism.

2. The food cutting device as claimed in claim 1, wherein the support is elongate along a longitudinal extent and the inner and outer parts extend over externally distinct sections along the longitudinal extent of the support.

3. The food cutting device as claimed in claim 2, wherein the outer part of the support is tubular, and the inner part extends at least partially within the outer part.

4. The food cutting device as claimed in claim 3, wherein the inner and outer parts of the support are inter-engaged against relative displacement along the longitudinal extent of the support.

5. The food cutting device as claimed in claim 1, wherein the inner part of the support has a lower end which extends out of the outer part and on which the support is rotatably supported on and in contact with a bottom of the container.

6. The food cutting device as claimed in claim 5, wherein the lower end of the inner part of the support is radially expanded.

7. The food cutting device as claimed in claim 5 wherein the bottom of the container includes a projecting cone and the lower end of the support includes a recess complementary to and receiving the projecting cone for rotational engagement of the support and the container.

8. The food cutting device as claimed in claim 1, wherein at least one of the inner and outer parts of the support has a polygonal socket, the corresponding one of the first and second drive output members has a polygonal cross-section complementary to the polygonal socket and is selectively insertable into the socket.

9. The food cutting device as claimed in claim 1, wherein the first drive output member co-axially surrounds the second drive output member, and the outer and inner parts of the support are engageable by respective ends of the first and second drive output members.

10. The food cutting device as claimed in claim 1, wherein
   the drive mechanism includes a manually operable actuator for driving the drive mechanism, the actuator reciprocating in opposite first and second directions for operation of the drive mechanism, and
   the drive mechanism includes a one-way clutch for driving the cutting blades only when the actuator is moved in a first direction.

11. The food cutting device as claimed in claim 10, wherein the actuator is resiliently biased to move in the second direction for self return, upon release of the actuator.

12. The food cutting device as claimed in claim 10, including a lid for covering the container, wherein the actuator lies on an outer surface of the lid for reciprocation on the outer surface.

13. The food cutting device as claimed in claim 1, including third and fourth cutting blades, wherein the first and third cutting blades are located at a first level on the support and the second and fourth cutting blades at a second level on the support.

14. The food cutting device as claimed in claim 1 including:
   a pivoting actuator; and
   gears coupling the actuator to the first and second output members for rotating the first and second output members and the first and second blades in opposite directions relative to each other in response to pivoting of the actuator in a single direction.

15. The food cutting device as claimed in claim 1 wherein the inner and outer parts of the support include respective sockets having polygonal cross-sections of different areas, the first and second drive output members have respective polygonal cross-sections respectively complementary with the sockets of the inner and outer parts of the support so that the first and second drive output members are selectively insertable into the sockets of the inner and outer parts of the support.

16. A food cutting device comprising:

a container;

a support supported in the container and including
- a rotatable tubular outer part on which a first cutting blade is mounted, and
- a rotatable inner part, coaxial with the outer part, on which a second cutting blade is mounted, the tubular outer part being rotatable independent of rotation of the inner part;

a lid mountable on the container, the lid including an outer surface and a pan opposite the outer surface and defining a housing between the outer surface and the pan; and a drive mechanism housed in the housing between the outer surface and the pan, supported on the container for driving and rotating the first and second cutting blades in opposite directions relative to each other to cut food located in the container, wherein
- the drive mechanism includes first and second drive output members projecting outwardly from the pan and respectively rotating the first and second cutting blades, and
- the first and second drive output members are axially engageable with and axially releasable from the inner and outer parts of the support so that the support is detachable from the lid and the drive mechanism.

17. The food cutting device as claimed in claim 16, including at least one self-locking device located on the lid for locking the lid to the container.

18. The food cutting device as claimed in claim 16, wherein the outer part of the support is tubular, and the inner part extends at least partially within the outer part.

19. The food cutting device as claimed in claim 16 including:

a pivoting actuator on the outer surface; and gears coupling the actuator to the first and second output members for rotating the first and second output members and the first and second blades in opposite directions relative to each other in response to pivoting of the actuator in a single direction.

20. The food cutting device as claimed in claim 16, wherein the inner part of the support has a lower end which extends out of the outer part and on which the support is rotatably supported on and in contact with a bottom of the container.

21. The food cutting device as claimed in claim 20 wherein the bottom of the container includes a projecting cone and the lower end of the support includes a recess complementary to and receiving the projecting cone for rotational engagement of the support and the container.

22. The food cutting device as claimed in claim 16, wherein at least one of the inner and outer parts of the support has a polygonal socket, the corresponding one of the first and second drive output members has a polygonal cross-section complementary to the polygonal socket and is selectively insertable into the socket.

23. The food cutting device as claimed in claim 16 wherein the inner and outer parts of the support include respective sockets having polygonal cross-sections of different areas, the first and second drive output members have respective polygonal cross-sections respectively complementary with the sockets of the inner and outer parts of the support so that the first and second drive output members are selectively insertable into the sockets of the inner and outer parts of the support.

24. The food cutting device as claimed in claim 16, wherein
- the drive mechanism includes a manually operable actuator for driving the drive mechanism, the actuator reciprocating in opposite first and second directions for operation of the drive mechanism, and
- the drive mechanism includes a one-way clutch for driving the cutting blades only when the actuator is moved in a first direction.

25. The food cutting device as claimed in claim 24, wherein the actuator is resiliently biased to move in the second direction for self return, upon release of the actuator.

* * * * *